April 11, 1950
J. R. SNYDER
2,503,639
SELECTOR VALVE
Filed Oct. 1, 1943
3 Sheets-Sheet 1
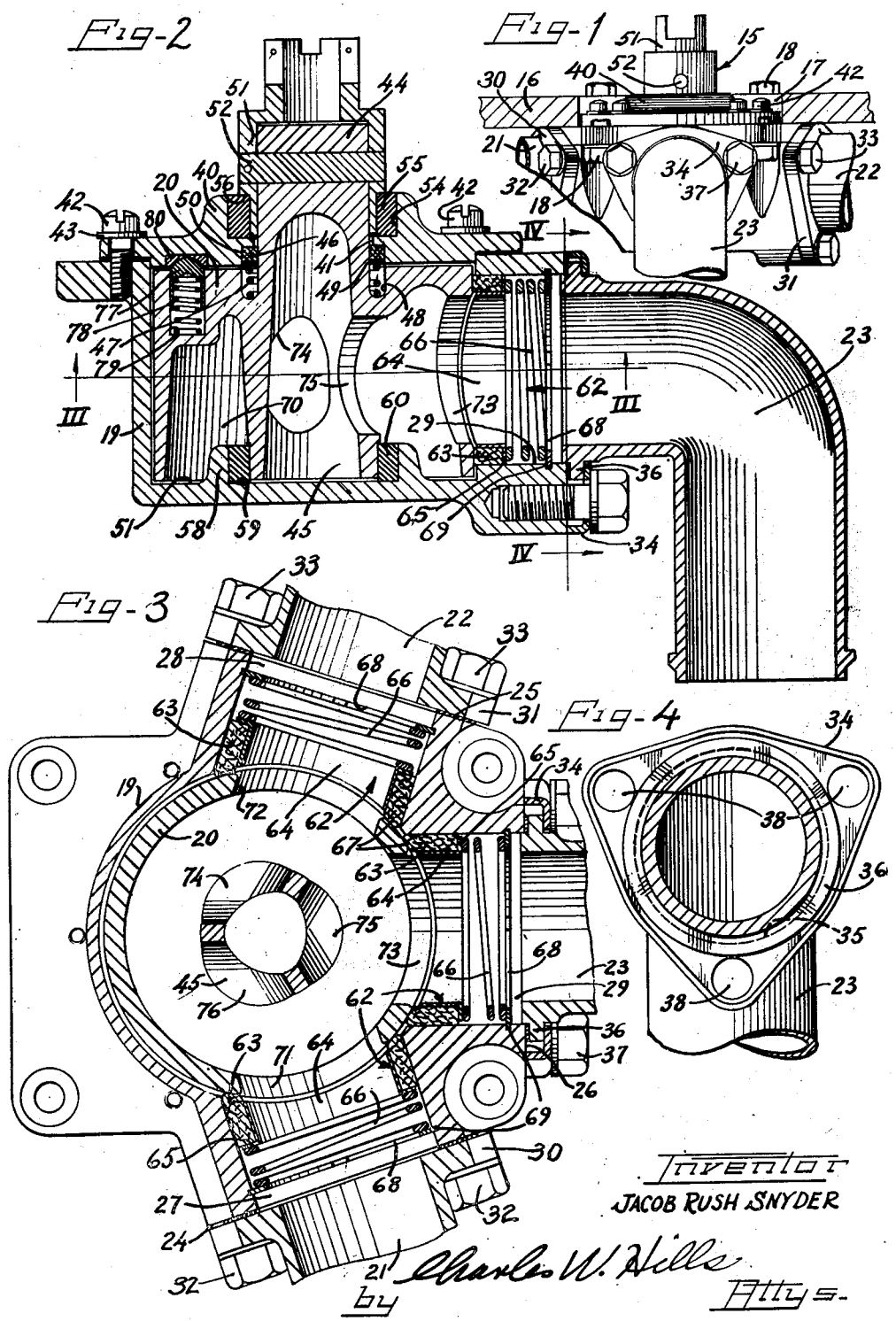
Inventor
JACOB RUSH SNYDER
by Charles W. Hills
Attys

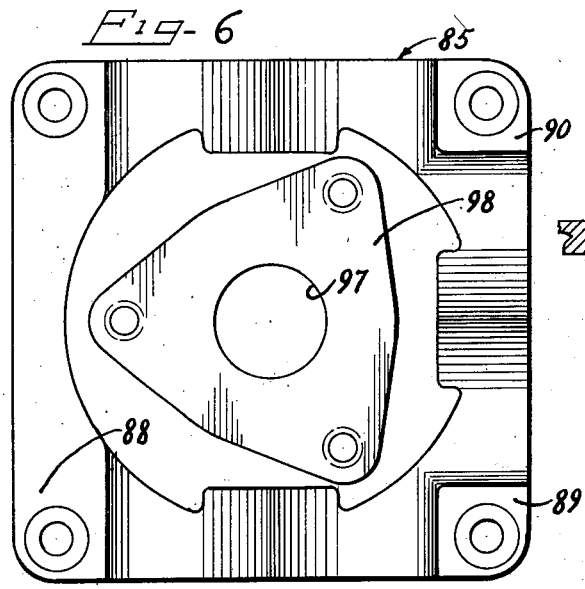
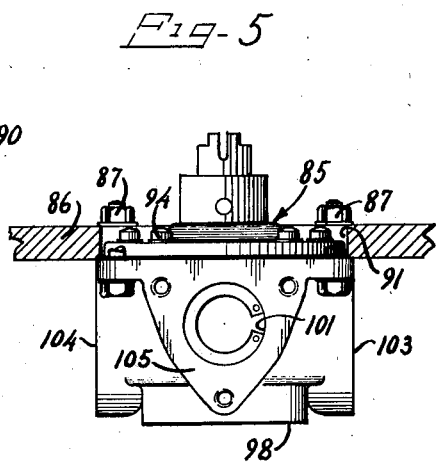
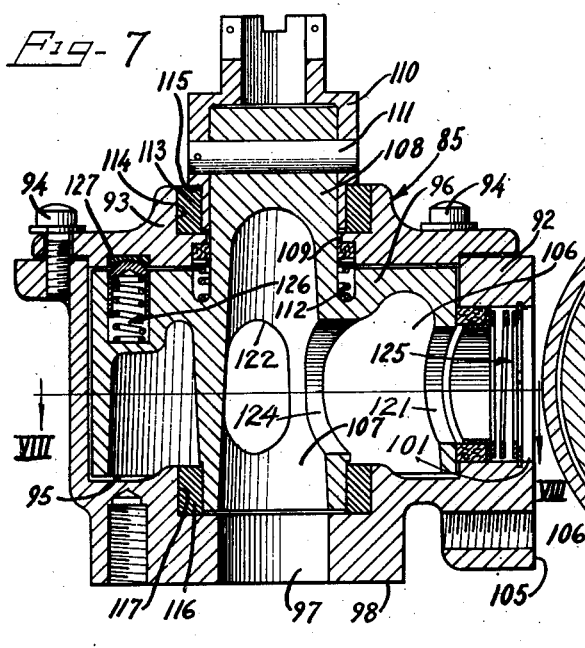
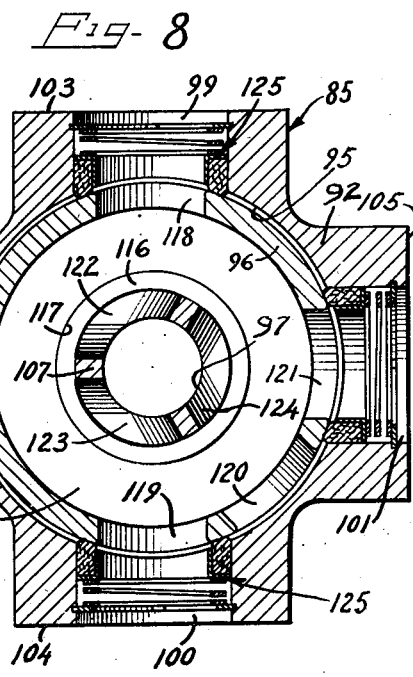

April 11, 1950     J. R. SNYDER     2,503,639
SELECTOR VALVE
Filed Oct. 1, 1943     3 Sheets-Sheet 3
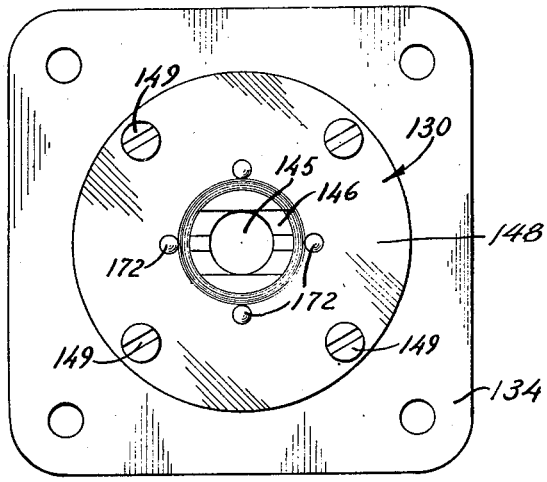
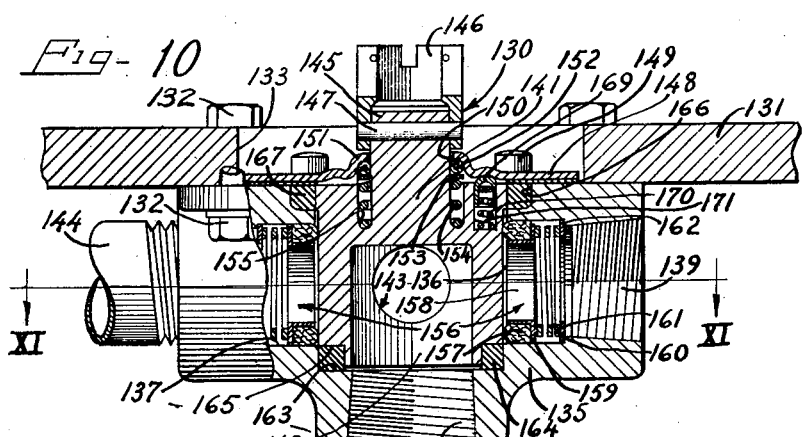
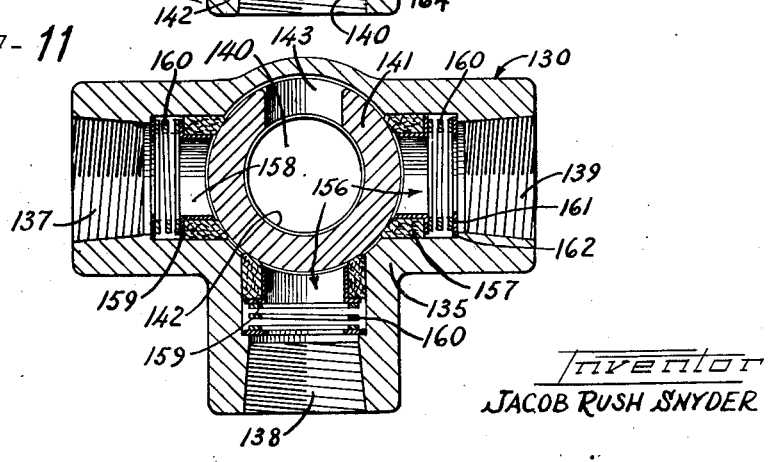
Inventor
JACOB RUSH SNYDER
by Charles W. Hills Attys Patented Apr. 11, 1950

2,503,639

UNITED STATES PATENT OFFICE 2,503,639

SELECTOR VALVE

Jacob Rush Snyder, Cleveland, Ohio, assignor to Thompson Products, Inc., Cleveland, Ohio, a corporation of Ohio Application October 1, 1943, Serial No. 504,534

2 Claims. (Cl. 251—113)

The present invention relates to certain improvements in the structure of valves and the like. More particularly, the invention concerns means for supporting a rotatable valve member in its housing member together with sealing means for maintaining a positive seal between the elements of the valve structure.

Specifically, the invention relates to the application of bearing means to a valve or the like for supporting the valve member in freely rotatable and spaced relation with respect to the inner surface of the valve housing. Moreover, it is further contemplated to provide a novel sealing means for preventing leakage between said valve member and said housing member.

In a plug, or cock type valve, in particular, it is customary to provide a relatively close surface-to-surface contact between the plug member and the housing member. This arrangement necessarily requires very close machining tolerances and a very high degree of accuracy in maintaining these tolerances to prevent leakage and inoperativeness of the finished valve structure.

In accordance with the present invention it is proposed to provide a spacing in valves and the like between the ordinary contiguous surfaces of the plug member and the housing member therefor. This novel concept requires much less accurate machining of the parts which may be supported in relatively rotatable relation by the use of bearing means, such, for example, as oilless, roller, or ball bearings or the like between the members to support the plug member with respect to its housing member. The provision of antifriction bearings not only reduces the possibility of wear, scoring and resultant damage of the valve parts but also greatly reduces the torque load required to shift the members.

Since a definite spacing is provided between the valve elements to minimize the importance of machining tolerances and decrease wear, it is expedient to provide an effective and readily adjustable sealing means between the several parts to prevent leakage. This is most advantageously accomplished, according to the present invention, by providing a form of self-adjusting sealing means between the housing member and the plug member. The present invention, moreover, contemplates the use of sealing means in multi-port units which are independent of each other and individually demountable for replacement and for adjustment.

It is, therefore, a primary object of the present invention to provide, among other things, an efficient valve structure having the aforementioned attributes and characteristics.

Another object of the present invention is to provide a valve assembly which is simple, low in cost and exceptionally high in functional efficiency.

It is another object of the present invention to provide a valve structure in which the sealing members are so disposed and resiliently supported that manufacturing irregularities, wear, flaws or shrinkages in the parts are automatically compensated for.

It is a further object of the present invention to provide in a valve structure sealing means for each individual port provided for the passage of fluid therethrough so that each port will be independently sealed and the swelling or shrinking of one or more of the seals will not affect the functioning of the remaining sealing means.

It is still another object of the present invention to provide a valve structure which is so designed that the external periphery of the plug or cylinder is free from contact with the inner periphery of the housing member thereby not only effectively reducing the torque required to operate the valve to a minimum but also avoiding the possibility of scoring, scalling or scuffing of the cylinder surface in contact with the sealing members which would otherwise make for leakage or an undesirably high torque.

Another and still further object of the present invention is to provide a valve structure which offers substantially no restriction to the flow of fluid therethrough in proportion to the internal diameters of the piping, tubing or other connections which are served.

It is a still further object of the present invention to provide a valve unit in which the line pressure aids in sealing the packing around the cylinder shaft as well as the port seal when fluid is flowing toward the periphery of the cylinder.

Still another object of the present invention is to provide a valve structure which can be manufactured without the use of high precision machinery and which by reason of permitting liberal manufactuing tolerances makes possible lower cost and higher production output per man hour to manufacture.

Still other features and objects of the present invention will be apparent from the following detailed description of the appended drawings, which, by way of prefered example, illustrate several embodiments of the invention.

In the drawings:

Figure 1 represents an elevation of a valve structure with parts broken away and in section illustrating the principles of the present invention;

Figure 2 is a vertical cross-section through the device of Figure 1 taken substantially at right angles to the plane of the elevation;

Figure 3 is a horizontal cross-section taken along the line III—III of Figure 2;

Figure 4 represents a sectional elevation from the line IV—IV in Figure 2 of one form of coupling means for securing a swivel type connection to the valve structure;

Figure 5 is an elevation of another form of valve structure to which the principles of the present invention are advantageously adapted to be applied;

Figure 6 represents a view of the base of the valve structure of Figure 5;

Figure 7 is a vertical cross-section taken through the device illustrated in Figure 5 taken substantially at right angles to the plane of the elevation;

Figure 8 represents a horizontal cross-section taken along the line VIII—VIII in Figure 7;

Figure 9 represents a plan view of another form of valve structure with which the teachings of the present invention may advantageously be employed;

Figure 10 is a side elevation of the device of Figure 9 with parts broken away and in section; and Figure 11 is a horizontal cross-section taken along the line XI—XI of Figure 10 of the drawings.

As shown on the drawings:

The device of Figures 1 to 3, inclusive, represents a form of valve structure commonly defined as a selector cock. The unit illustrated is particularly advantageously adapted to be employed in an airplane for the purpose of handling the fuel supply and is capable of selectively interconnecting one or the other, or both simultaneously, of a pair of fuel tanks with the motor driven fuel pump customarily employed in such apparatus. The valve structure, indicated generally by the reference character 15, is capable of being mounted in the manner illustrated in Figure 1 by securing the same to the partition wall 16 so as to register with an aperture 17 in said wall and be secured thereto by a plurality of bolts 18 in such manner that the valve body will be substantially flush with the under surface of the partition 16 so that only the control portion, to be hereinafter described in detail, extends through the aperture 17.

The valve structure 15 comprises a casing 19 in which is disposed a rotatably mounted plug 20 for controlling the supply of fluid from the connections 21 and 22 to the outlet 23. The connections 21, 22 and 23 are each secured to the external faces 24, 25 and 26, respectively, of the casing 19 adjacent to and in cooperative relation with the ports 27, 28 and 29, respectively. The connections 21 and 22 are secured to the faces 24 and 25 as by means of a flange 30 or 31, as the case may be, and bolts 32, 33. A substantially triangularly shaped collar member 34 having a central circular opening 35 which engages the flange portion 36 of the connection 23 and is secured to the face 26 of the casing 19 as by bolts 37 which register with apertures 38 permits the connection 23 to be disposed in rotatable relation with respect to the port 29.

A cover 40 which is centrally apertured as indicated by the reference character 41 is secured to the casing 19 as by means of a plurality of bolts 42 backed by washers 43, said bolts being threaded into said casing 19 and suitable gaskets being provided between said cover and said casing. The upwardly projecting shank portion 44 of a central cylindrical portion 45 which may advantageously be formed integrally with the body of the plug 20 extends through the opening 41 in said cover member 40. A suitable packing assembly including packing ring 46 backed by a washer 49 and held in place in a counterbore 50 on the under side of the cover 40 as by means of a spring 47 encircling the shank 44 and positioned as by means of the groove 48 in the upper end of the plug 20 may be provided to prevent the possibility of fluid leakage from the chamber 51 within the casing 19 about the external periphery of the shank 44. A yoke connection 51 is adapted to be fitted over the end of the shank 44 of the plug 20 extending through the cover 40 and is attached thereto by means of a diametrically disposed pin 52 which extends through said shank 44.

The cover 40 is provided with a counterbore 54 which is concentric with the aperture 41 therein and is adapted to receive a suitable bearing 55 which may be press fit or otherwise suitably secured in said counterbore 54. The bearing 55 which is advantageously of annular form is adapted to accommodate internally thereof the lowermost end of the yoke connection 51 the shoulder 56 of which is adapted to engage the upper surface of said bearing 55. A raised boss 58 disposed internally of the casing 19 and formed on the base thereof has a counterbore 59 into which is press fit or otherwise suitably secured a bearing 60 similar in character to that of the bearing 55. The bearing 60 is adapted to receive internally thereof the lower end of the integral cylindrical portion 45 of the plug 20 in rotatable relation within its inner periphery.

The bearings 55 and 60 disposed in the cover 40 and the base of the casing 19, respectively, are thus capable of rotatably supporting the plug 20 with respect to the internal chamber 51 of the casing 19. The bearings 55 and 60 may advantageously be formed of oil impregnated material such, for example, as, "Morganite" or the like or may be of the ball or roller bearing type of frictionless bearing. The plug 20 may thus be rotatably supported in the chamber 51 of the casing 19 in spaced relation with respect to the internal periphery of said casing 19. This spaced relation of the plug 20 and the casing 19 reduces the torque required to shift the plug 20 ordinarily encountered by virtue of the friction between the outer periphery of the plug member 20 and the internal periphery of the casing 19 or the sealing means provided therebetween. Scoring, scalling or scuffing of the plug 20 or of the inner surface of the casing 19 are thus prevented from affecting the operation of the valve structure.

By virtue of the spaced relation of the plug 20 with respect to the interior of the casing 19 suitable sealing assemblies such, for example, as those indicated generally by the reference character 62 may be provided to afford positive sealing engagement between the plug 20 and the several ports 27, 28 and 29 in the casing 19. The sealing assembly 62 may advantageously comprise a resilient sealing member 63 which may be composed of such material as cork, rubber, synthetic rubber or any suitable plastic material disposed internally of which is a sleeve member 64. The sleeve member 64 is provided with a flange 65 which projects over the external face of the sealing member 63 and provides a contact surface for the compression spring 66 which serves to urge the substantially dished or concave surface 67 of the sealing member into contact with the outer periphery of the plug 20. A snap ring 68 which is adapted to be positioned in an annular groove 69 cut or formed internally of each of the several ports 27, 28 and 29 retains the spring 66 in each of said ports in contact with the surface of flange 65 of the sleeve 64.

The plug 20 is advantageously formed as a hollow closed topped generally cylindrical member in which is integrally formed the cylindrical portion 45 which thus forms internally of said plug 20, a substantially inverted cup-shaped chamber 70. In order to afford unrestricted communication between the several ports 27, 28 and 29 of the casing 19 or any two or more of said ports a plurality of apertures 71, 72 and 73 for communication with said ports is provided in the external wall of the plug 20 enclosing the chamber 70. Similarly, in order to provide completely unhampered passage of the fluid through the interior of the plug 20 a corresponding number of apertures 74, 75 and 76 are provided in the generally cylindrical portion 45 disposed centrally of the plug 20 and formed integrally therewith. This form of construction is advantageous in that it provides a relatively light plug 20 for support and rotation by the bearings 55 and 60 as well as a considerable saving in material in its fabrication.

Any suitable form of indexing means may be employed in cooperative relation between the plug 20 and the casing 19 so as to indicate the station at which the plug is positioned and also to prevent absolutely free rotation of said plug with respect to the casing when it is desired to retain the same in one particular position. For this purpose there has been illustrated a form of indexing means embodying a nub 77 backed by a compression coil spring 78 and disposed in slidable relation with respect to a bore 79 in the upper face of the plug 20. The nub 77 is adapted to be urged by the spring 78 into a cupped insert 80 press fit into the under surface of the cover 40, a plurality of said cupped members 80 being provided to correspond with the number of stations or positions for the plug 20 with respect to the casing 19.

It will also be apparent from the foregoing description that the valve unit of Figures 1 to 3, inclusive, provides a freely rotatable plug 20 which is disposed internally of the casing 19 and in spaced relation with respect to the internal periphery thereof and further provides spaced bearing means in the casing for supporting said plug therein. The sealing assemblies 62 associated with each of the ports 27, 28 and 29 in the casing 19 are adapted to be adjustably held in contact with the outer periphery of the plug 20 and afford substantially leakproof connection between the several ports and apertures 71, 72 and 73 in the plug 20 when connection therebetween is established by the positioning of the plug 20 with respect to the casing 19. The sealing assemblies 62 are particularly advantageous in that they are self-adjusting being capable of maintaining constant contact with the surface of the plug member 20 at all times in the operation of the valve structure. Moreover, any one or more of the sealing assemblies 62 may be removed from the ports independently of the other similar assemblies or the elements of the valve structure by removing the snap ring 68 from the groove 69 with which it registers and disassembling the parts, as may be desired.

The valve structure illustrated in Figures 5 to 8, inclusive, of the drawings is generally similar to that of Figures 1 to 3 but differs therefrom principally in the fact that an outlet is provided in the base thereof which may communicate with any one or more of a plurality of ports in the casing thereof. The valve unit 85, like the valve 15 in Figure 1, is adapted to be mounted upon a partition wall or other suitable mounting base 86 as by means of a plurality of bolts 87 which extend through suitably disposed apertures in the flange portions 88, 89 and 90 shown in Figure 6. As before, the control portion for manipulating the valve unit 85 projects through an aperture 91 in the partition 86 while the body of the valve is mounted on the under side or back of the partition 86.

The valve 85 as illustrated in Figure 7 of the drawings comprises a casing 92 to which is secured a cover 93 in any suitable fashion such, for example, as by means of the bolts 94 and forming therein a chamber 95 which is adapted to receive the plug 96. Suitable gaskets are provided between the cover 93 and casing 92. The casing 92 is provided with a port 97 disposed in the base thereof having associated therewith a substantially triangularly shaped flange 98 to which a suitable piping connection may be secured. The port 97 together with the radially disposed ports 99, 100 and 101 in the casing 92 communicate with the chamber 95 for directing the passage of fluid through the valve 85. The flanges 103, 104 and 105 disposed about the ports 99, 100 and 101, respectively, are provided for the purpose of attaching thereto pipe connections serving the valve 85.

The plug 96 is substantially similar to the plug 20 of the embodiment of the invention illustrated in Figure 2 of the drawings in that it encloses a chamber 106 disposed between its outer walls and a substantially cylindrical portion 107 which terminates in a shank portion 108 projecting through an aperture 109 in the cover 93. Associated with the shank portion 108 is a yoke connection 110 secured to said shank portion as by means of the pin 111. A suitable packing gland assembly indicated generally by the reference character 112 and substantially identical to that employed in the valve structure illustrated in Figure 2 encircles the shank portion 108 and the plug 96 to prevent leakage of the fluid from the chamber 95 about the external periphery of the shank portion 108.

An annular bearing 113 is adapted to be press fit or otherwise suitably secured in a counterbore 114 disposed concentrically with respect to the aperture 109 in the cover 93 and to receive internally thereof the lowermost end of the yoke connection 110 and engaging the shoulder 115 on said yoke connection. A similar annular bearing 116 is secured in a counterbore 117 which is disposed substantially concentrically with respect to the port 97 in the base of the valve 85 and receives in its internal periphery the lowermost end of the generally cylindrical portion 107 of the plug 96. The bearing means 113 and 116 provided in the cover 93 and the casing 92, respectively, serve to support the plug 96 in freely rotatable relation within the chamber 95 formed in said casing 92.

A plurality of openings extending through the outer wall of the plug 96 and communicating with the chamber 106 therein, said openings indicated by the reference characters 118, 119, 120 and 121, are adapted to cooperate with the several ports 99, 100 and 101 depending upon the position of the plug 96 with respect to the casing 92. It will be noted that a greater number of openings 118 to 121, inclusive, are provided in the wall of the plug 96 than there are ports in the casing 92, for the reason that it may be desired to join the port 97 in the base of the valve 85 with one port at a time or to simultaneously place all of the outlets in communication therewith.

It will be apparent that if the plug 96 is rotated through an angle approximately 45° from the position illustrated in Figure 8 and in a clockwise direction, the opening 120 will register with the port 100 while the openings 118, 119 and 121 will be positioned opposite blank spaces in the wall of the casing 92. Thus, the ports 99 and 101 will be closed off from communication with the chamber 95. Similarly, if the plug 96 is rotated through an angle of approximately 45° in a counterclockwise direction, the port 101 will communicate directly with the opening 120 while the openings 118, 119 and 121 will again be positioned at blank portions in the wall of the casing 92 thereby closing off the ports 99 and 100 from communication with the chamber 95.

Communication between the chamber 106 within the plug 96 and the port 97 in the base of the casing 92 is provided by a plurality of apertures 122, 123 and 124 in the generally cylindrical portion 107. The openings 122, 123 and 124 provide a substantially unhampered flow of fluid from the chamber 106 in communication with one or more of the ports 99, 100 and 101 through the generally cylindrical portion 107 to the port 97. As in the case of the illustrated embodiment of the invention shown in Figure 2, a plurality of sealing assemblies 125 are provided, one being associated with each of the ports 99, 100 and 101 in the casing 92 of the valve 85 to prevent leakage of the fluid between the outer wall of the plug 96 and the inner periphery of the casing 92. These sealing assemblies are in each instance exactly similar to the assemblies 62 of Figures 2 and 3.

As in the case of the valve 15 of the previously described embodiment of the invention, the valve 85 is provided with a plurality of cupped inserts 127 in the under face of the cover member 93 which are adapted to register with an indexing assembly 126 which is provided in the body of the plug 96 and is generally similar to that of the unit previously described in connection with the embodiment of the invention of Figure 1. The indexing assembly 126 is provided to indicate the position of the plug 96 with respect to the casing 92 and to afford a certain degree of resistance to the freedom of movement of the plug 96 in the chamber 95 in the casing 92 when the plug is positioned in a manner to locate the openings 118, 119, 120 or 121 in the desired relation with respect to the ports 99, 100 and 101 in the casing 92.

The valve unit 130 illustrated in Figures 9 to 11, inclusive, of the drawings differs somewhat from that of the valve units 15 and 85. As before, however, the valve 130 is adapted to be secured to a partition wall or other suitable mounting base 131 as by means of a plurality of bolts 132 so that the valve body is disposed in back of or below the partition wall but has the controlling portion extending through an aperture 133 in said wall 131. The flange 134 which is apertured to accommodate a plurality of bolts 132 for mounting the valve 130 upon the wall 131 advantageously forms an integral part of the casing 135.

The casing 135 which defines an internal chamber 136 is provided with a plurality of ports 137, 138 and 139 which are disposed in substantially radial relation with respect to the chamber 136 and adapted to communicate with said chamber and a port 140 in the base thereof. The plug 141 of generally cylindrical form encloses an internal chamber 142 which is open at the bottom to communicate with the port 140 in the casing 135. An opening 143 extending through the wall of plug 141 connects the chamber 136 formed in the casing 135 with the internal chamber 142 in the plug 141. Each of the ports 137, 138, 139 and 140 may be internally threaded as indicated to receive a plurality of connections such, for example, as pipe 144 threaded into the port 137.

The plug 141 is provided with a shank portion 145 of generally cylindrical form which is adapted to receive the yoke connection 146 secured thereto as by means of a pin 147 for rotating the plug 141. A cover plate 148, which is indicated as being in the form of a stamping although it may be of any suitable form, is secured to the casing 135 as by means of a plurality of bolts 149 which may be threaded into the body of the casing 135. The cover plate 148 is centrally apertured as at 150 to permit the shank portion 145 of the plug 141 to project therethrough. A raised boss portion 151 formed in the cover plate 148 is adapted to accommodate a packing gland assembly which includes a packing ring 152 backed by a washer 153 and a spring 154 all of which encircle the shank portion 145 of the plug 141. An annular groove 155 in the plug 141 receives the spring 154 so as to urge the washer 153 and the packing ring 152 in sealing engagement with the shank portion 145 to prevent leakage of the fluid from the chamber 136 in the casing 135.

A sealing assembly 156 is disposed internally of each of the ports 137, 138 and 139 in the casing 135 so as to prevent leakage between the inner wall of the casing 135 and the external face of the plug 141. The sealing assembly 156 comprises a sealing ring 157, a sleeve member 158 having a flange 159, a compression spring 160 disposed between the flange 159 of the sleeve 158 and a washer 161 positioned against an annular shoulder 162 formed internally of each of the ports 137, 138 or 139, as the case may be. The sealing assemblies 156, as in the case of those previously described in connection with the other illustrated embodiments of the invention, are freely adjustable to any irregularities which may be present in the external surface of the plug 141 and so as to effectively seal the valve unit 130 against leakage from one port to the other.

A counterbore 163 in the base of the casing 135 and disposed in substantially concentric relation to the port 140 therein is adapted to receive an annular bearing 164 which may be press fit or otherwise suitably secured therein. The lowermost end of the plug 141 is adapted to be inserted in the inner periphery of the bearing 164 and is provided with a shoulder 165 formed thereon to support said plug 141 against the surface of the bearing 164. A counterbore 166 formed substantially concentrically with respect to the chamber 136 in the casing 135 and adjacent the uppermost end thereof receives the bearing 167 which is secured therein in any suitable fashion and adapted to contact the uppermost portion of the external periphery of the plug 141. The bearings 164 and 167, therefore, are adapted to support the plug 141 in freely rotatable relation with respect to the casing 135.

An indexing means which is generally similar to that of the previously described illustrated embodiments of the present invention embodies a nub 169 and a spring 170 backing up said nub and disposed in a bore 171 in the upper surface of the plug 141 registers with each of a number of cupped bosses 172 formed in the cover plate 148. One such boss 172 is positioned adjacent the location in the casing 135 of each of the ports 137, 138 and 139 to indicate when the opening 143 in the plug 141 is in communication with one or the other of the several ports in casing 135. In addition, a boss 172 is provided for the position of the plug 141 in which the opening 143 therein is completely out of communication with any of the ports in the casing 135 corresponding to its position illustrated in Figure 11. As before, the indexing assembly also serves to prevent unauthorized shifting of the plug 141 with respect to the casing 135 when it has been placed in the position desired.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fluid flow control device having a housing defining an operating chamber with a ported side wall and an end wall, the improvements comprising a light weight rotary valve plug having an outer, ported, cylindrical skirt wall freely rotatable within said chamber and spaced from the ported side wall of the chamber, whereby the ports of said skirt wall are selectively alignable with the ports of said chamber side wall, said plug also having a hollow cylindrical central portion coaxial with said skirt, a first replaceable bearing means journalling said central portion in said end wall of said chamber, a shank portion on said valve coaxial with said central portion but projecting out of said chamber in the opposite direction, a second replaceable bearing means on said housing journalling said shank portion, said central cylindrical portion having radial apertures in the walls thereof, thereby defining a relatively unrestricted flow chamber between the ports of the skirt wall, sealing sleeves slidably mounted in said housing ports and having end faces contoured to engage the skirt of the plug, and means urging said sealing sleeves toward the chamber to press the end faces thereof against the skirt of the plug in sealing relation therewith.

2. In a fluid flow control device having a housing defining a generally cylindrical operating chamber with a radially ported side wall and an axially ported end wall, the improvements comprising a light weight rotary valve plug having an outer, ported, cylindrical skirt wall freely rotatable within said chamber and spaced from the ported side wall of the chamber, whereby the ports of said skirt wall are selectively alignable with the ports of said chamber side wall, said plug also having a hollow, cylindrical central portion coaxial with said skirt wall, a first replaceable bearing means journalling said central portion in said end wall of said chamber with the hollow interior of said central portion communicating with said axial port, a shank portion on said valve coaxial with said central portion but projecting out of said chamber in the opposite direction, a second replaceable bearing means on said housing journalling said shank portion, said central cylindrical portion having radial apertures in the walls thereof, thereby defining a relatively unrestricted flow chamber between the ports of the skirt wall and the bore of said central portion of the plug, sealing sleeves slidably mounted in the radial ports of the housing side wall and having end faces contoured to engage the skirt of the plug, and means urging said sealing sleeves toward the operating chamber of the housing to place the end faces thereof against the skirt of the plug in sealing relation therewith.

JACOB RUSH SNYDER.

REFERENCES CITED

The following references are of record in the file of this patent:

UNITED STATES PATENTS

| Number | Name | Date |
| --- | --- | --- |
| 1,048,635 | Allerding | Dec. 21, 1912 |
| 1,732,828 | Bijur | Oct. 22, 1929 |
| 1,797,382 | Wade | Mar. 24, 1931 |
| 2,030,458 | McKellar | Feb. 11, 1936 |
| 2,055,562 | Schneider | Sept. 29, 1936 |
| 2,138,530 | Wagner | Nov. 29, 1938 |
| 2,191,232 | Heinen | Feb. 20, 1940 |
| 2,206,541 | Allen | July 2, 1940 |
| 2,233,840 | Koehler | Mar. 4, 1941 |
| 2,290,349 | Ohls | July 21, 1942 |
| 2,405,940 | Burkhardt | Aug. 20, 1946 |

FOREIGN PATENTS

| Number | Country | Date |
| --- | --- | --- |
| 349,531 | Italy | June 16, 1937 |
| 665,650 | Germany | Sept. 30, 1938 |